UNITED STATES PATENT OFFICE.

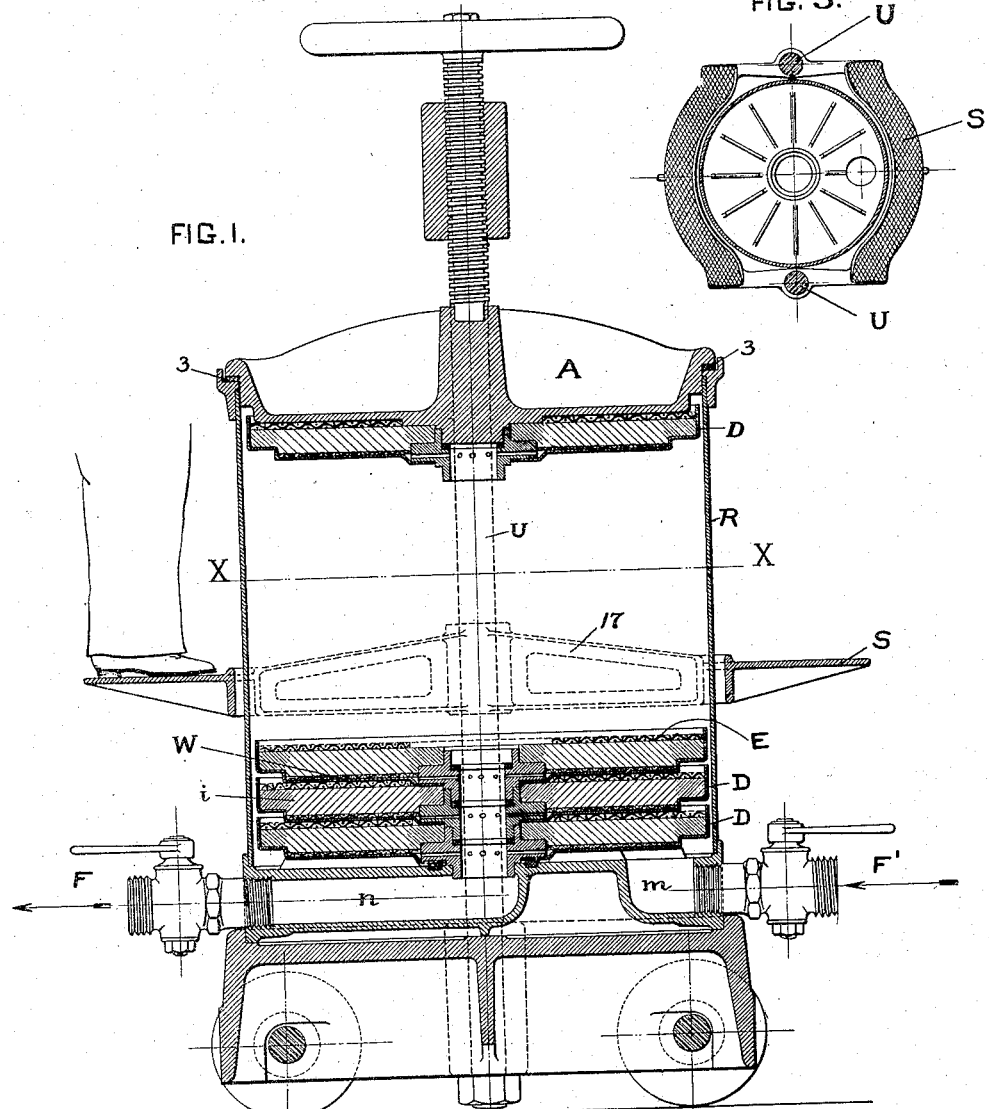
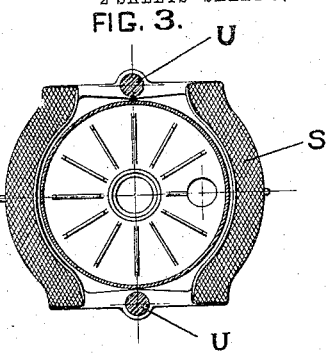
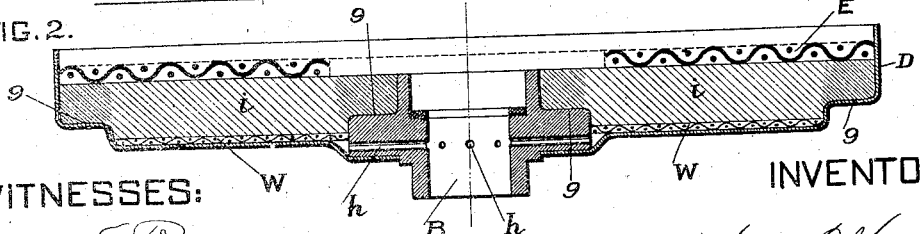

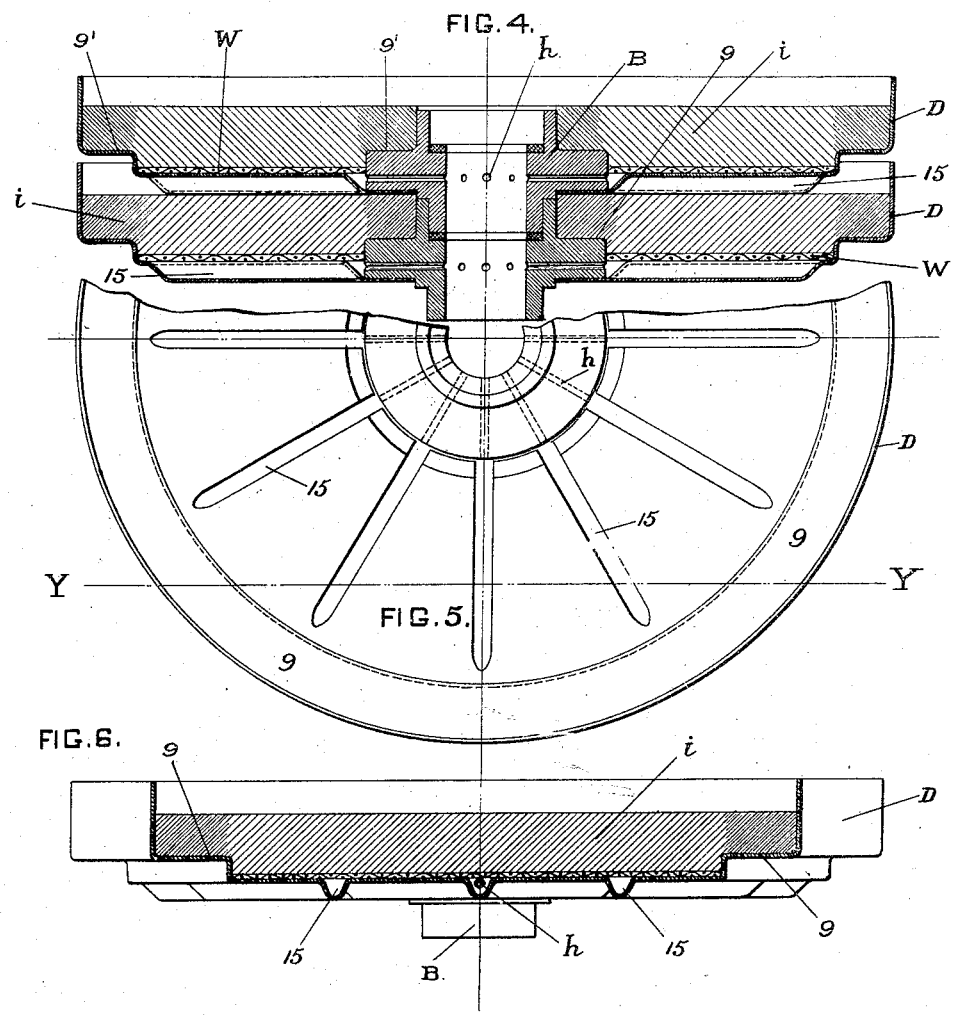

KARL KIEFER, OF CINCINNATI, OHIO.

FILTERING APPARATUS.

No. 812,931.     Specification of Letters Patent.     Patented Feb. 20, 1906.

Application filed March 6, 1903. Serial No. 146,596.

*To all whom it may concern:*

Be it known that I, KARL KIEFER, a citizen of the United States, residing at Cincinnati, in the county of Hamilton and State of Ohio, have invented useful Improvements in a Filter, of which the following is a specification.

The purpose of the present invention is to devise a more simple and advantageous construction for the filter-plates as shown in my Patent No. 579,586, granted to me March 30, 1897. It also shows numerous other advantages derived by the novel construction, as set forth in detail.

Figure 1 shows a cross-section through an assembled filter. Fig. 2 shows a cross-section through one of the new filter-plates. Fig. 3 is a top view of the empty filter-plate. Fig. 4 is a cross-section through a modified form of the new filter-plate. Figs. 5 and 6 are views of the same plate.

The general arrangement of the filter-plates and the working of same are similar to those described in Patent No. 579,586. I therefore do not need to repeat the detailed description, especially as I have retained the same reference-letters as far as possible. The liquid to be filtered, however, is admitted to the filter layers from the peripheries of the filtering-plates. All filter-plates are therefore placed into an air-tight drum or casing R, which is hermetically covered by cover A, an arrangement similar to the arrangement described in Letters Patent to Piefke, No. 335,040, and often used by other inventors and easily understood. As it is desirable to place as many filter-plates as possible into the filter-drum R in order to get as much filtering-surface as possible, it is necessary that the filter-plates should be made as light as possible and that they should not take up much room in the filter. The complexity of the filter-plates, however, has necessitated the casting of them in brass and the turning of them subsequently on the lathe, this making them costly, heavy, and occupying considerable space within the filtering-drum R. My new plate, as shown in Fig. 2, consists of a sheet-metal pan-like part D and a cast-metal hub B, soldered to the pan perfectly tight. This hub is perforated with radial holes *h*. In the bottom part of pan D there is a woven sheet of metal gauze W. This sheet of metal gauze fills two purposes. In the first place, it is fine enough that it is fiber-retaining. By the words "fiber-retaining wire screen" I understand a fine and pliable wire screen with meshes fine enough to retain the fibers of the filter mass if the filter mass is mixed with water to a thin mixture, such as is usually used in pulp-filters, before compressing, and thrown upon such screen. The meshes of such a screen are from thirty to fifty to the inch, is often woven in a manner called "twilled," but is always pliable and hardly exceeds a thickness of one-sixteenth of an inch, which is high enough to give sufficient room between it and the bottom of the sheet-metal pan D for the clear liquid to flow to the center of the pan through the holes *h* of hub B, connecting from there to the outlet *n* of the filtering-machine. This new construction especially obviates complicated outlet-conduits, which used to take quite a good deal of space from the filtering-drum.

The plate D shows a ring-shaped offset 9', in which neighborhood the filter mass is seen to be compressed more than over the wire mat W. The hub also shows an offset 9 for the compression of the filtering mass. These offsets 9 and 9' serve to form a sort of gasket, preventing the cloudy liquid from communicating with the wire mat W, and therefore to prevent it from getting access to the conduits for the clear liquid. A wire mat E is placed on top of the filter mass, and this wire mat, in conjunction with the lower part of the sheet-metal pan D, forms the conduit for the cloudy liquid.

In Figs. 4, 5, and 6 is shown a modification of filter-plate D whereby it can be dispensed with wire mat E. It is seen from Figs. 4 and 5 that longitudinal ribs 15 are punched into the bottom part of the sheet-metal pan D. They are seen in cross-section in Fig. 6, and they will hold down the filter mass *i* and allow the liquid to be filtered to pass between them. They also serve as collectors for the clear liquid underneath the wire mat W. They are seen to connect with holes *h* of the metal central hub B in Figs. 5 and 6, and they ultimately serve to stiffen the sheet-metal pan D.

Fig. 1 shows a series of plates, as shown in Fig. 2, assembled ready for operation. I have shown only the three lowest plates and the top plate in the drawings; but the intermediate plates are to be thought as existing. It will be seen that the top cover A presses directly on the top plate D, also closes up drum R by means of a circular gasket 3, therewith making the whole arrangement airtight. In order to facilitate the execution of these two purposes—i. e., bearing down upon the system of plates and making an air-tight closure of drum R—I have arranged cover A so that it is sunk into the drum R, so that it will bear for quite a considerable distance upon the plates D and guide itself centrally within drum R before gasket 3 is compressed. Cover A therefore acts in a certain sense as a piston at first.

Figs. 1 and 3 show the application of a step S for a greater convenience of the man handling the filtering-machine. Fig. 1 shows the cross-section of the step and a bracket 17, carrying it, in dotted lines. The bracket 17 is carried by the two uprights U of the filter-frame. Fig. 3 shows the whole step, bracket, and uprights as viewed from the top. These steps, however, have another purpose. They are for protecting the drum R from collision during the using and operation of the filter. They also protect the inlet and outlet faucets F and F' from harm. They also serve as a shelf for tools, gaskets, &c.

What I claim as my invention, and desire to secure by Letters Patent, is—

1. In a filter, the combination of a pan having a plane imperforate bottom, of a single woven mat in contact on one side with said bottom, on the other side in contact with the filtering layer of compressed pulp.

2. In a filter, the combination with a pan having a plane imperforate bottom, of a single woven fiber-retaining mat, in contact on one side with said bottom, on the other side with the filtering layer of compressed pulp.

3. In a filter, in combination, a filter layer of compressed pulp contained within a circular pan, having ring-shaped surfaces protruding into said filter layer of a width at least equal to the thickness of the filter layer at the edge, said ring-shaped surfaces tightly connected to the inner side of the pan next to the clear-liquid conduit.

4. In a filter, a filtering layer within a pan, in combination only with a single woven fiber-retaining wire mat between filter layer and pan, with means of supplying cloudy liquid to the filtering layer.

5. In a filter, the combination of a filter layer within a circular pan, said pan having tightly connected to its inside ring-shaped surfaces higher than the bottom and projecting into the filter layers, in combination with means for supplying unfiltered liquid to the filter layers, said surfaces of a width at least equal to the thickness of the filter layer at the edge and conducting the filtered liquid away.

6. In a filter, the combination with a single woven mat in contact with a filtering layer on one side, on the other side with a plane imperforate surface, of means for circulating liquid through filter layer and mat.

7. In a filter, the combination with a single woven fiber-retaining mat in contact with a filtering layer on one side, on the other side a plane imperforate surface, of means for circulating liquid through filter layer and mat.

8. In a filter, the combination of a filtering layer of compressed pulp within a circular pan having ring-shaped surfaces higher than the bottom, and projecting into the filtering layers, in combination with a woven mat between filtering layer and bottom of pan, with means of supplying unfiltered liquid to the filter layer.

9. In a filter, the combination of a filtering layer of compressed pulp within a circular pan, the pan-like part of an equal thickness throughout except the central part, having ring-shaped surfaces higher than the bottom, and projecting into the filtering layers, in combination with a woven mat between filtering layer and bottom of pan, with means of supplying unfiltered liquid to the filter layers.

10. In a filter, the combination of a filtering layer of compressed pulp within a circular pan, the pan-like part of an equal thickness throughout, except the central part, horizontal ring-shaped surfaces projecting into the filtering layers, in combination with a woven mat between filtering layer and bottom of pan, with means of supplying unfiltered liquid to the filter layers.

11. In a filter, the combination of a filtering layer of compressed pulp within a circular pan, the pan-like part of an equal thickness throughout, except the central part, having an upturned edge and a metal hub and ring-shaped surfaces higher than the bottom and projecting into the filtering layers, in combination with a woven mat between filtering layer and bottom of pan, with means for supplying unfiltered liquid to the filtering layer.

12. In a filter, the combination of a filtering layer of compressed pulp within a circular pan having an upturned edge and cylindrical hub in center, smooth bottom and ring-shaped surfaces higher than the bottom and projecting into the filtering layers, in combination with a woven fiber-retaining mat between filtering layer and bottom of pan, with means of supplying unfiltered liquid to the filter layers.

13. In a filter, the combination of a filtering layer of compressed pulp, with a circular sheet-metal pan having an upturned edge and smooth bottom, and ring-shaped surfaces higher than the bottom and projecting into the filtering layers, in combination with a woven mat between filtering layer and bottom of pan, with means of supplying unfiltered liquid to the filter layer.

14. In a filter, the combination with a series of circular filter elements, of an external drum and of a cover partly projecting into the drum, said cover having a cylindrical part smaller than the drum and guided by the drum, and said cylindrical part of cover being of sufficient height to allow the use of the cover as means of compressing the filter elements.

15. The combination with a disk-shaped filtering layer of compressed pulp contained within a pan having a clear-liquid way in its bottom, of a smooth surface tightly attached to the pan outside of said clear-liquid way and in intimate contact with the edge of said filtering layer and parallel thereto, said smooth surface of a width at least equal to the thickness of the filter layer at the edge.

16. In a filter, the combination of a base with two uprights, of a sheet-metal drum with a cover, of a projecting-ring of greater strength than the sheet-metal drum and higher than the base, and adapted to protect the sheet-metal bottom from injury substantially as described.

17. In a filter, the combination of a base with two uprights, of a sheet-metal drum with a cover, of a protecting projection of greater strength than the sheet-metal drum and higher than the base, and adapted to protect the sheet-metal bottom from injury substantially as described.

18. In a filter, the combination of a base with two uprights, of a sheet-metal drum with a cover, of a protecting-ring of greater strength than the sheet-metal drum rigidly fastened to the uprights, higher than the base, and adapted to protect the sheet-metal body from injury.

19. In a filter, in combination, a filter layer of compressed pulp contained within a circular pan having ring-shaped surfaces in intimate contact with the edges of the filtering layer, said ring-shaped surfaces parallel to the filtering layer and of a width at least as wide as the thickness of the filtering layer at its edge.

20. The combination with a disk-shaped filtering layer of compressed pulp, of an imperforate metal surface separating it entirely from the neighboring filtering layer, of surfaces of intimate contact along the edges of said filtering layer between the filter layer and imperforate surfaces, said edges of contact of a width at least equal to the thickness of the filtering-surface at the point of contact and tightly attached to the said imperforate separating-surface.

21. The combination in a filter, of a pan having a vertical peripheral border, next to this border and tightly connected therewith a smooth ring-shaped surface at least as wide as the thickness of the filtering layer, a filter layer of compressed pulp within the pan in contact with said peripheral ring-shaped edge, but spaced apart elsewhere from the pan by means constituting a liquid-way, and of means to supply the liquid-way with liquid.

22. The combination in a filter, of a pan having a vertical central border, next to this border and tightly connected therewith a smooth ring-shaped surface at least as wide as the thickness of the filtering layer, a filter layer of compressed pulp within the pan in contact with said central ring-shaped edge, but spaced apart elsewhere from the pan by means constituting a liquid-way, and of means to supply the liquid-way with liquid.

23. The combination in a filter, of a pan having a vertical peripheral border, and next to this border and tightly connected therewith, and parallel to the bottom of the pan, smooth ring-shaped surfaces of a width at least equal to the thickness of the filter layer at its edge, a filter layer of compressed pulp within the pan in contact with said ring-shaped edge, but spaced apart elsewhere from the pan by means of a liquid-conductor, of means pressing said filter layer at all times against said smooth ring-shaped surfaces.

24. The combination in a filter, of a pan having a vertical peripheral border, and next to this border and tightly connected therewith, and parallel to the bottom of the pan, smooth ring-shaped surfaces of a width at least equal to the thickness of the filter layer at its edge, a filter layer of compressed pulp within the pan in contact with said ring-shaped edge, but spaced apart elsewhere from the pan by means of a wire-screen liquid-conductor, of means pressing said filter layer at all times against said smooth ring-shaped surfaces.

25. The combination in a filter, of a pan having a vertical peripheral border, and next to this border and tightly connected therewith, and parallel to the bottom of the pan, smooth ring-shaped surfaces of a width at least equal to the thickness of the filter layer at its edge, a filter layer of compressed pulp within the pan in contact with said ring-shaped edge, but spaced apart elsewhere from the pan by means of an open-work liquid-conductor, of means pressing said filter layer at all times against said smooth ring-shaped surfaces.

26. The combination in a filter, of a pan having a vertical peripheral border, and next to this border and tightly connected therewith, and parallel to the bottom of the pan, smooth ring-shaped surfaces of a width at least equal to the thickness of the filter layer at its edge, a filter layer of compressed pulp within the pan in contact with said ring-shaped edge, but spaced apart elsewhere from the pan by means of an open-work liquid-conductor, of means pressing said filter layer at all times against said smooth ring-shaped surfaces consisting of wire screen pressed against by the neighboring filter element.

Witness my hand, this 21st day of January, 1903, at the city of Cincinnati, in the county of Hamilton and State of Ohio.

KARL KIEFER.

Witnesses:
G. W. WERDEN,
CHARLES L. RICHTER.